March 29, 1955

H. V. ZUMETA 2,704,861

MOLD REGISTERING PINS

Filed Feb. 26, 1953

INVENTOR.
HERMAN ZUMETA
BY
ATTORNEY

March 29, 1955  H. V. ZUMETA  2,704,861
MOLD REGISTERING PINS
Filed Feb. 26, 1953  2 Sheets-Sheet 2

INVENTOR.
HERMAN ZUMETA
BY
ATTORNEY

United States Patent Office 2,704,861
Patented Mar. 29, 1955

2,704,861

MOLD REGISTERING PINS

Herman V. Zumeta, Carlstadt, N. J.

Application February 26, 1953, Serial No. 339,021

7 Claims. (Cl. 18—42)

This invention relates to new and useful improvements in mold registering pins for use in aligning molds or mold plates in injection, transfer and other molding processes in the rubber, plastic and the like industries.

More particularly, the present invention proposes the construction of an improved pair of registering pins which can be used in molds or mold plates without freezing, sticking or breaking as the molds or mold plates expand and contract under the heat used in molding.

Another object of the present invention proposes forming the new mold registering pins so that they will hold the molds or mold plates to which they are attached in proper alignment and yet allow for expansion or contraction, caused by uneven heat absorption of the molds or mold plates.

Still further, the present invention proposes constructing the mold aligning pins with bevelled edged fitting parts and an aligned guide peg and guide peg opening, to insure proper coaction and alignment of the mating parts of the mold aligning pins.

As a further object, the present invention proposes arranging the pairs of mold aligning pins on the molds or mold plates so that the pins will permit expansion outwardly from the center of the mold simultaneously in four or more directions and similar contraction while holding the molds or mold plates in perfect alignment.

The present invention further proposes a novel arrangement of the new registering pins on molds or mold plates, so that mold expansion and contraction in alternating hot and cold methods of molding, will be freely permitted to assure a clean molded product, without causing the registering pins to rupture, freeze, score, or break.

For further comprehension of the invention, and of the objects and advantages thereof, reference will be had to the following description and accompanying drawings, and to the appended claims in which the various novel features of the invention are more particularly set forth.

On the accompanying drawings forming a material part of this disclosure:

Figure 1:
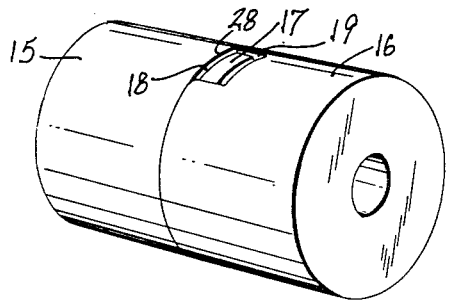
Fig. 1 is a perspective view of a pair of mold registering pins constructed in accordance with the present invention.
Figure 2:
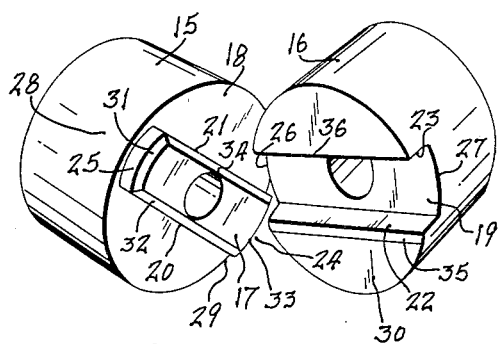
Fig. 2 is a similar view to Fig. 1, but showing the pins apart.

The pair of mold registering pins, in accordance with the first form of the invention illustrated in Figs. 1 to 4, inclusive, comprises a male pin 15 and a female pin 16. The male pin 15 has a male portion 17 dependent from its face 18 and the female pin 16 has an opening 19 to receive the male portion 17 of male pin 15.

Preferably, both male pin 15 and female pin 16 are round or cylindrical in shape, are of the same diameter, and are made of steel, hardened and grounded.

The male portion 17 of the male pin 15 is other than round in shape. As shown in Figs. 1 to 4, inclusive, it is rectangular in shape and has two opposed sides 20 and 21, fitting closely in the female opening 19 of female pin 16, against the sides 22 and 23 of the female opening. Relative movement of the male and female pins in this direction, i. e., across the male portion 17 or female opening 19, is prevented by the close fitting sides 20, 21, 22 and 23 of the male portion and female openings, respectively.

Male portion 17 of male pin 15, also has two opposed sides 24 and 25, which fit loosely in the opening 19 of the female pin 16 and are spaced from the adjacent sides 26 and 27 of the female opening 19, a distance sufficient to permit free mold expansion and contraction in those directions, i. e. lengthwise of the male portion 17 and female opening 19.

The rectangular shaped male portion 17 of male pin 15, is radially disposed across face 18 of male pin 15, but terminates short of and is spaced from the sides 28 and 29, of the cylindrical male pin, a distance more than the normal lineal thermal expansion of a mold.

The female opening 19 in female pin 16, is a slot opening in face 30 of female pin 16, which extends radially across the cylindrical pin. The female opening 19 is of greater depth than the male portion 17 of male pin 15 to permit the faces 18 and 30 of the male and female pins, respectively, to form a clearance for rubber or any other molding material which may overflow.

Male portion 17 has bevelled edges 31, 32, 33 and 34 and the female pin 16 has similar bevelled edges or radii 35 and 36 along its opening 19 to aid proper meshing of the male portion 17 in the female opening 19, when the pins 15 and 16 are closed together.

Figure 4:
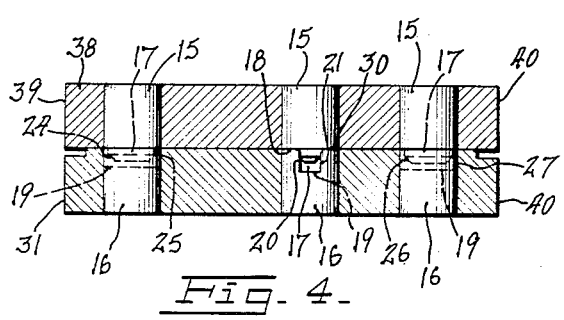
Fig. 4 is a sectional view taken through the registering pins in the plate shown in Fig. 3, and the mating pins in the second or upper mold plate.
Figure 5:
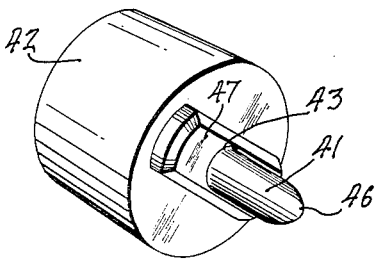
Fig. 5 is a perspective view of a male pin having a guide peg secured therein and illustrating a modification of the present invention.
Figure 3:
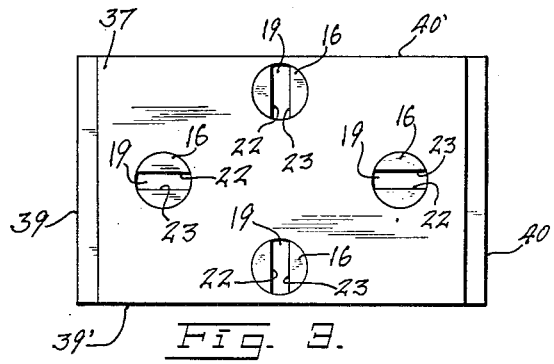
Fig. 3 is a top plan view of the lower of a pair of mold plates containing a plurality of the female pins shown in Figs. 1 and 2, in a novel and useful arrangement.

In Figs. 3 and 4, a plurality of female pins 16 are secured in the bottom plate 37 of a mold, and their mating male pins 15 are secured in a top plate 38 of the mold, in alignment with the female pins 16. The pairs of pins are spaced from each other. One set of pins is disposed at one end 39 of the plates and another set at the opposite end 40, of the plates.

The other two sets of pins are oppositely disposed at the sides 39' and 40' of the plates. The male portions 17 and the female openings 19 of the two sets disposed at the ends 39 and 40, of the plates 37 and 38, are disposed in the same direction, i. e., they both run lengthwise of the plates, and the male portions 17 and female openings 19 of the other two sets, are disposed at right angles to those of the sets disposed at the ends 39 and 40 of the plates 37 and 38 i. e., they run crosswise of the plates. In this manner, pins 15 and 16 permit expansion outwardly from the center of the mold plates simultaneously in four directions and contraction inwardly simultaneously in four directions and at the same time, hold the mold plates in perfect alignment and registration. It is apparent that the female slot openings and male portions may be radially disposed on round mold plates to permit expansion and contraction in any number of radial directions.

Figure 6:
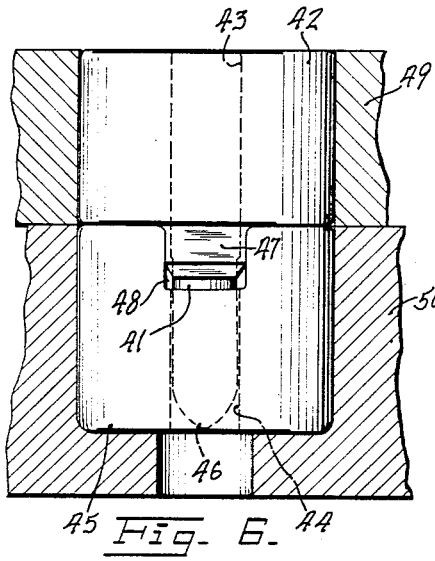
Fig. 6 is a fragmentary sectional view through two mold plates, showing how the male pin of Fig. 5 and its mating female pin hold the plates in registration.
Figure 7:
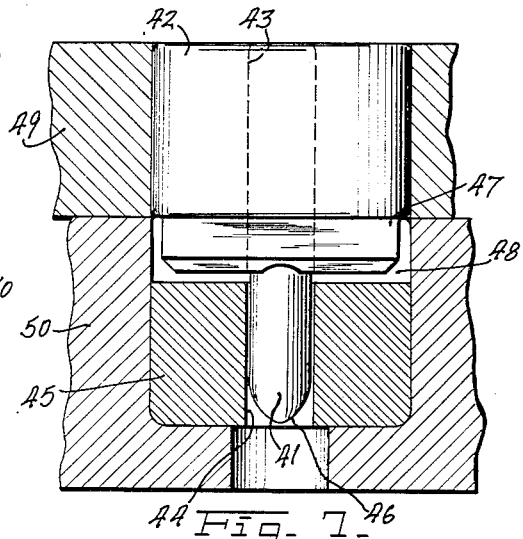
Fig. 7 is a view similar to Fig. 6, but taken at ninety degrees thereto and showing the female pin in vertical section.

The modification illustrated in Figs. 5, 6, 7, 8 and 9, is characterized by the provision of a guide peg 41, axially disposed in the male pin 42 and frictionally secured in an opening 43 therethrough. The guide peg 41 extends into a guide peg opening in female pin 45, the guide peg opening 44 being larger in diameter than the peg 41, so that the peg fits freely in the opening. The lower end 46 of the guide peg 41 is tapered and rounded so as to aid in guiding the male portion 47 of male pin 42 into the female opening 48 of female pin 45. Figs. 6 and 7 illustrate how pins 42 and 45 hold two mold plates 49 and 50 in register or alignment.

Figure 8:
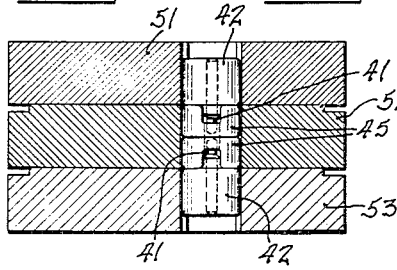
Fig. 8 is a view of three mold plates held in registration by the mold pins shown in Figs. 5, 6 and 7.

Fig. 8 shows how two pairs of registering pins 42 and 45 may be used to hold three mold plates 51, 52 and 53 in registration.

Figure 9:
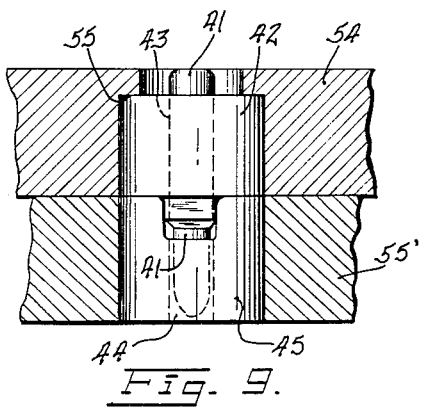
Fig. 9 is a view similar to Fig. 6, but illustrating another modification.

Fig. 9 is similar to Fig. 6, but shows how the male pin 42 may be disposed in a mold plate 54 with part of the mold plate extending as a flange 55 over the top of the pin and the guide peg 41 extending above the top of the pin 42 flush with the top of mold plate 54. A lower mold plate 55' holds the female pin 45.

Figure 10:
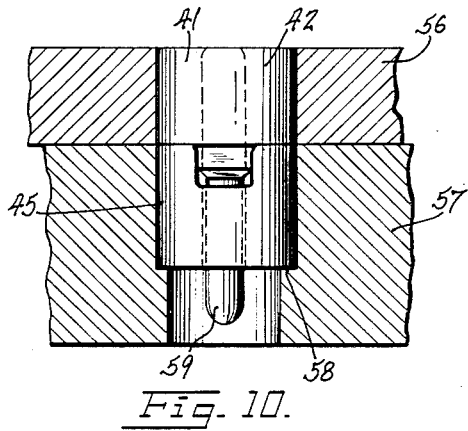
Fig. 10 is a view similar to Fig. 9, but illustrating a further modification.

Fig. 10 illustrates how male pin 41 and female pin 45 may be secured in mold plates 56 and 57, respectively, the lower mold plate 57 having an abutment shoulder 58 to receive the bottom of the female pin 45. In this case, a longer guide pin 59 may be used extending down below the female pin 45.

Figure 11:
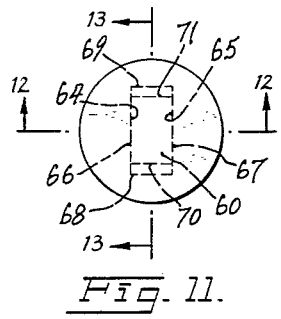
Fig. 11 is a top plan view illustrating a still further modification of the present invention.
Figure 12:
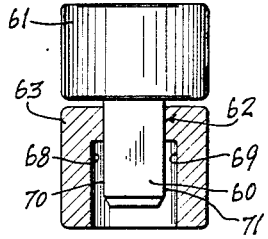
Fig. 12 is a sectional view taken on line 12—12 of Fig. 11.
Figure 13:
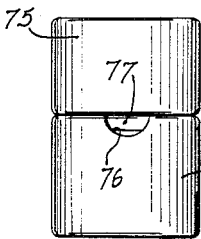
Fig. 13 is a sectional view taken on line 13—13 of Fig. 11.

Figs. 11, 12 and 13, illustrate how a rectangular male portion 60 and a cylindrical male pin 61, may fit through a female opening 62 in female pin 63, the female opening being bordered by opposed sides 64 and 65 of the female pin which fit closely against sides 66 and 67 of male portion 60, and being bordered by two other opposed sides 68 and 69, in the female pin which loosely receives sides 70 and 71, of the male portion 60.

Figure 14:
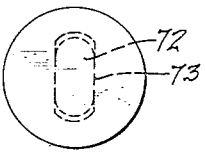
Fig. 14 is a top plan view showing another modification.

Fig. 14 illustrates how the male portion 72 and the female portion 73 may be made oval, oblong or elongated in shape with close fitting sides and loosely fitting ends.

Figures 15, 16:
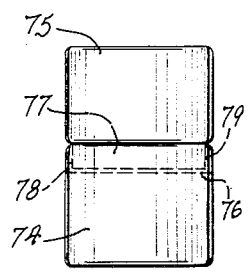
Fig. 15 is a side view illustrating a further modification.
Fig. 16 is a view similar to Fig. 15, but taken at ninety degrees thereto.

Figs. 15 and 16 illustrate how a female pin 74 and a male pin 75 may be provided with a half-round female slot opening 76 and a similar shaped male portion 77, the pins being prevented by the male portion and the female slot opening from movement crosswise of the slot and the male portion, but being free to move lengthwise of the slot and male portion the distance which the ends 78 and 79 of the male portion 77 are spaced from the outer sides or surfaces of the cylindrical pins.

It is to be understood that these registering pins and the guide pegs may be made of any suitable material, shape and size, and they may be of separate or integral parts. The pegs may be located either in the male or the female registering pins. The locations and number of these registering pins may also be changed as desired for the particular purpose depending upon the material.

While I have illustrated and described the preferred embodiment of my invention, it is to be understood that I do not limit myself to the precise construction therein disclosed and the right is reserved to all changes and modifications coming within the scope of the invention as defined in the appended claims.

Having thus described my invention, what I claim as new and desire to secure by United States Letters Patent is:

1. A pair of mold registering pins comprising a male pin and a female pin, said male pin having a male portion and said female pin having an opening to receive the male portion, said male portion having two opposed sides fitting closely in the opening and two opposed sides fitting loosely in the opening and spaced from the adjacent sides of the opening, a distance sufficient to permit free mold expansion in those directions, said female opening being of greater depth than the depth of the male portion.

2. A pair of mold registering pins comprising a male pin and a female pin, said male pin having a male portion and said female pin having an opening to receive the male portion, said male portion having two opposed sides fitting closely in the opening and two opposed sides fitting loosely in the opening and spaced from the adjacent sides of the opening, a distance sufficient to permit free mold expansion in those directions, said male portion having rounded edges and said female pin having similar rounded edges along its opening to aid proper meshing of the male portion in the female opening, when the pins are closed together, said female opening being of greater depth than the depth of the male portion.

3. A pair of mold registering pins comprising a cylindrical male pin and a cylindrical female pin of like diameter, said male pin having a male portion dependent from one face and radially disposed across the pin but terminating short of and spaced from, the sides of the cylindrical male pin, a distance greater than the normal lineal expansion of a mold, said female pin having a slot opening in one face extending radially across the pin to receive the male portion of the male pin, said male portion of the male pin also having two opposed sides fitting closely in the female opening, said male portion having bevelled edges and said female pin having similar bevelled edges along its opening to aid proper meshing of the male portion in the female opening when the pins are closed together, said female opening being of greater depth than the depth of the male portion.

4. A pair of mold registering pins comprising a male pin and a female pin, said male pin having a male portion and said female pin having an opening to receive the male portion, said male portion having two opposed sides fitting closely in the opening and two opposed sides fitting loosely in the opening and spaced from the adjacent sides of the opening, a distance sufficient to permit free mold expansion in those directions, said female pin having an axial opening transverse of the female opening and said male pin having an axially disposed guide peg smaller than the axial opening in the female pin, freely to fit in said axial opening to aid in alignment of the male portion of the male pin and the female opening in the female pin.

5. A pair of mold registering pins comprising a cylindrical male pin and a cylindrical female pin of like diameter, said male pin having a male portion dependent from one face and radially disposed across the pin but terminating short of and spaced from, the sides of the cylindrical male pin, a distance greater than the normal lineal expansion of a mold, said female pin having a slot opening in one face extending radially across the pin to receive the male portion of the male pin, said male portion of the male pin also having two opposed sides fitting closely in the female opening, said female pin having an axial opening transverse of the female opening and said male pin having an axially disposed guide peg smaller than the axial opening in the female pin freely to fit in said axial opening to aid in alignment of the male portion of the male pin and the female opening in the female pin.

6. A pair of mold registering pins comprising a cylindrical male pin and a cylindrical female pin of like diameter, said male pin having a male portion dependent from one face and radially disposed across the pin but terminating short of and spaced from, the sides of the cylindrical male pin, a distance greater than the normal lineal expansion of a mold, said female pin having a slot opening in one face extending radially across the pin to receive the male portion of the male pin, said male portion of the male pin also having two opposed sides fitting closely in the female opening, said male portion having bevelled edges and said female pin having similar bevelled edges along its opening to aid proper meshing of the male portion in the female opening when the pins are closed together, said female opening being of greater depth than the depth of the male portion, said female pin having an axial opening transverse of the female opening and said male pin having an axially disposed guide peg, smaller than the axial opening in the female pin, freely to fit in said axial opening to aid in alignment of the male portion of the male pin and the female opening in the female pin.

7. A pair of mold registering pins comprising a male pin and a female pin, said male pin having a male portion and said female pin having an opening to receive the male portion, said male portion having two opposed sides fitting closely in the opening and two opposed sides fitting loosely in the opening and spaced from the adjacent sides of the opening a distance sufficient to permit free mold expansion in those directions, said female and male pins having axially aligned openings through them transverse of the female opening and the male portion of the male pin, and a guide peg adapted to fit securely in axial opening in one of the pins and removably and loosely fit in the axial opening of the other pin to aid in alignment of the male portion of the male pin and the female opening in the female pin.

References Cited in the file of this patent

UNITED STATES PATENTS

| | | |
|---|---|---|
| 1,546,955 | Vannoni | July 21, 1925 |
| 2,095,985 | Huck | Oct. 31, 1934 |
| 2,218,195 | Garrett | Oct. 15, 1940 |